(12) United States Patent
Gibson et al.

(10) Patent No.: US 7,645,819 B2
(45) Date of Patent: Jan. 12, 2010

(54) EXTRUDABLE PVC COMPOSITIONS

(75) Inventors: Brian L. Gibson, Bloomfield, NJ (US); Fred Durrenberger, Columbia, MO (US)

(73) Assignee: Honeywell International Inc., Morristown, NJ (US)

( * ) Notice: Subject to any disclaimer, the term of this patent is extended or adjusted under 35 U.S.C. 154(b) by 567 days.

(21) Appl. No.: 10/766,430

(22) Filed: Jan. 28, 2004

(65) Prior Publication Data

US 2004/0259984 A1 Dec. 23, 2004

Related U.S. Application Data

(60) Provisional application No. 60/445,492, filed on Feb. 6, 2003.

(51) Int. Cl.
C08K 5/15 (2006.01)
D01F 1/02 (2006.01)
(52) U.S. Cl. .......................... 524/57; 264/211
(58) Field of Classification Search ................ 524/57; 264/211
See application file for complete search history.

(56) References Cited

U.S. PATENT DOCUMENTS

| 3,635,856 | A | * | 1/1972 | Kaneko et al. ................ 524/57 |
| 4,283,310 | A | | 8/1981 | James et al. |
| 6,121,440 | A | | 9/2000 | Kenneally et al. ........... 536/115 |
| 6,504,003 | B1 | | 1/2003 | Trout et al. ................ 528/271 |

FOREIGN PATENT DOCUMENTS

JP 1994306188 A 11/1994

WO WO 2004/072167 A1 8/2004

OTHER PUBLICATIONS

Trade literature obtained from http://www.mfc.co.jp/english/index.htm, Mitsubishi-Kagaku Foods Corporation, copyright 2002 ©.*
J. Edenbaum, Ed., Plastic Additives and Modifiers Handbook, Van Nostrand Reinhold, New York 1992, Chapter 3.

* cited by examiner

*Primary Examiner*—William K Cheung
(74) *Attorney, Agent, or Firm*—Carrie Beaths

(57) ABSTRACT

The present invention provides an extrudable resin-containing composition comprising at least saccharide ester, preferably according to Formula I.

Formula I:

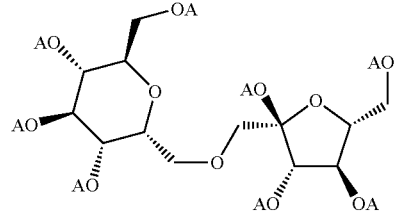

wherein "A" is hydrogen or has the structure of Structure I:

Structure I

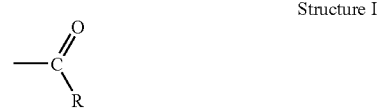

wherein "R" is an aliphatic or aromatic moiety of about eight to about 40 carbon atoms, and wherein at least one "A" moiety of Formula I is a moiety of Structure I. Also provided are extrusion methods and extruded products based on the present compositions.

34 Claims, No Drawings

EXTRUDABLE PVC COMPOSITIONS

CROSS REFERENCE TO RELATED APPLICATIONS

The present application is based on and claims the priority of U.S. provisional application No. 60/445,492 filed Feb. 6, 2003, which is incorporated herein by reference.

BACKGROUND OF THE INVENTION

Extrusion of thermoplastic materials, such as polyvinyl chloride (PVC) resin, generally requires heating an extrudable mixture to a temperature at which it can undergo plastic flow and subsequently forcing it through a plate containing one or more orifice openings (sometimes referred to as a die), to impart a profile shape to the emerging extrudate. The extrudate is then cooled until it becomes sufficiently rigid to retaining the profile shape.

In general an extrusion feedstock composition is prepared by combining a thermoplastic polymer, such as PVC resin, with one or more adjuvants, such as lubricants. For example, extrudable PVC compositions are described in Handbook of Plastic Materials and Technology, Ed. I. Rubin, Wiley-Interscience, John Wiley & Sons, Inc. New York, 1990 and Plastics Additives and Modifiers Handbook, Ed. J. Edenbaum, Van Nostrand Reinhold, New York 1992, Chapter 3, each of which is incorporated herein by reference. Examples of additional components include filler, for example calcium carbonate, processing aids, for example acrylic copolymers, and stabilizer which imparts heat stability to the composition during the extrusion process, for example, a tin based stabilizer such as TM281® from Rohm & Haas. The composition is commonly then "fused," that is, subjected to heating and blending until it forms a plastic composition which is substantially homogeneous. The various additives and the amounts of the additives used influence the properties of the extrudable composition both during the fusion process and after it has been "fused." The properties of the composition in turn affect the performance, such as processability, of the material during extrusion or in follow-on processes in which the extruded material is employed. Of the various components comprising typical extrudable PVC compositions, the lubricant included in the composition can have an important influence on one or more of the properties related to processability, as well as on the quality of an extruded article. Standards for the properties and performance of extruded thermoplastic articles are well known, for example, ASTM Standard D3679-03e2 for PVC siding and D1785-03 for PVC pipe, as well as DIN Standard 16830-3 for high-impact PVC profiles for windows and doors.

Dimensional stability is an important characteristic affecting the commercial value of an extruded product and hence of the processes and the components used to make the extruded product. Dimensional stability is assessed by observing the amount by which an extruded shape expands during solidification after it emerges from the die of an extrusion apparatus. The amount of expansion is sometimes referred to as die swell.

For a given extrudable composition, it is generally possible to increase the rate at which material is extruded. However, such extrusion rate increases have practical limitations. For example, it is possible to obtain extrusion rate increases by operating the extruder at a higher temperature and/or at a higher head pressure. However, at some point of increasing extruder temperature the extrudable composition will generally begin to scorch, and the surface and structural qualities of the extrudate will begin to degrade. Furthermore, as the head pressure or extruder torque is increased, a point is generally reached at which the dimensional stability and/or surface condition of the extruded material is unacceptable. These process limitations have created practical limits on the rate at which prior compositions could be extruded.

Another mechanism that is at least theoretically available to achieve higher extrusion rates is to increase the amount and/or type of lubricant incorporated into the extrudable composition. However, it is also possible that increasing the amount of the lubricant or changing the type of lubricant can have deleterious effects on the extruded product and/or on other aspects of the extrusion process. For example, increasing the amounts of certain lubricants known as internal lubricant may compromise one or more of the inherent physical properties of an extruded article, such as a reduction in the tensile strength of an extruded article. Also, increased amounts of external lubricant may negatively impact not only the strength of the extrudate but may also increase the fusion time, which increases the overall processing time.

Applicants have thus come to recognize the need for extrudable compositions, particularly extrudable PVC-based compositions, having one or more of those desirable extrusion characteristics associated with high levels of lubricant while reducing or substantially eliminating one or more or the adverse effects that would otherwise be associated with a high level of lubricant. The present methods and extrudable compositions meet this and other needs.

SUMMARY OF THE INVENTION

One aspect of the present invention provides extrudable compositions, more preferably extrudable compositions comprising thermoplastic polymer such as polyvinylchloride, and at least one saccharide ester, preferably disaccharide ester, and even more preferably sucrose ester. Applicants have discovered that such compositions are capable of exhibiting a highly desirable yet difficult to obtain combination of properties. For example, in certain preferred embodiments the present extrudable compositions are capable of exhibiting desirably low inherent viscosity values and/or other properties which are generally advantageous and/or desirable for the extrusion characteristics of the composition, while at the same time being capable of extrusion into a solid form with desirable properties, such as relatively high tensile strength and/or a relatively high degree of dimensional stability.

Another aspect of the present invention involves processes for extruding a thermoplastic composition, preferably a polyvinyl chloride-based composition. The process preferably comprises:

a) providing an extrudable thermoplastic mass comprising at least one thermoplastic polymer and at least one saccharide ester, preferably sucrose ester; and b) extruding said extrudable mass to form a shaped article.

Saccharide ester is preferably present in the composition in an amount effective to improve the extrudability of extrudable mass, preferably by at least about 10 percent, more preferably by at least about 20 percent, and even more preferably at least about 30 percent, relative to the extrudability of the extrudable mass in the absence of saccharide ester. The extrudability of an extrudable mass can be measured by any one of several characteristics of the extrudable mass, as described in detail hereinafter.

According to another aspect of the present invention, shaped articles are provided based upon and/or formed using the extrudable compositions and/or the extrusion methods of the present invention.

DETAILED DESCRIPTION OF PREFERRED EMBODIMENTS

Although it is contemplated that the present invention will have the greatest applicability in connection with extrusion of thermoplastic polymers, it is believed that it will also have applicability to other extrudable compositions. For example, ram extrusion of polymers that are not strictly thermoplastic, such as polytetrafluoroethylene (PTFE), may be beneficially affected by the present invention. Therefore, the term "extrudable composition" is used herein to refer not only to composition that contain polymers with thermoplastic properties, but also those polymers that are readily extrudable by known techniques or otherwise behave similar to thermoplastic polymers with respect to extrusion processes. Such extrudable polymers, whether thermoplastic or otherwise, are sometimes referred to herein for convenience as resins.

The Methods

The present invention is directed in one aspect to methods of forming shaped articles from an extrudable composition. Generally, the first step is to provide an extrudable composition in accordance with the present invention. Although it is contemplated that the extrudable composition of the present invention may be provided by any means known in the art, it is generally preferred that the extrudable composition is formed by combining at least a resin and a saccharide ester of the present invention under conditions effective to form an extrudable composition. As is known in the art, the requirements of an extrudable composition vary widely depending in the equipment being used and the desired properties of the extrudate, among other factors, and all such extrudable compositions are within the scope of the present invention. Generally, these conditions include mixing the combined resin, saccharide ester and one or more other components that may be present. Preferably, the blending step causes shear heating within the composition, and the combination of shear and heat cause the individual particles of the composition to soften and fuse, creating a substantially homogeneous mass. At the point of fusing (fusion point), the identity of individual particulates in the composition is preferably substantially lost.

When such heating and blending is performed under known standard testing conditions, the period of blending required to reach the fusion point is referred to as the "fusion time." Generally, at the fusion point, the viscosity of the composition is at a maximum, and it is at about this same point that a maximum will occur in the torque required to blend the mass. The torque maximum is related to the fusion viscosity and is reported as fusion torque. With continued blending, it is expected that the viscosity of the composition, and the torque required to blend the composition, will decrease to a relatively steady state condition. The steady state value is referred to as the equilibrium viscosity, the temperature of the composition at this point is referred to as the equilibrium temperature, and the torque required to blend the composition at this point is referred to as equilibrium torque. With further continued blending, it is expected that the composition would begin to cross-link and the viscosity of the composition, and hence the blending torque, would begin to rise. The elapsed time between the fusion point and the beginning of a measurable rise in viscosity due to cross-linking is referred to as the stability time. The methods of the present invention then require extruding the provided extrudable composition to form a shaped article. Preferably, the extrusion step includes bringing the extrudable composition of the present invention to a temperature at which it can undergo plastic flow. In preferred embodiments this comprises heating the extrudable composition and forcing the extrudable composition through a die containing one or more openings to impart a profile shape to the emerging extrudate.

One important characteristic of the present methods, and a technique which can be used to measure the extrudability, relates to the amount of force required to force the present composition through the die. In general, the step of forcing the extrudable composition through a die in accordance with the present methods advantageously requires an amount of force which is relatively low in comparison to other methods capable of producing an extrudate of comparable quality to that which can be produced in accordance with the present invention. Preferably the saccharide ester is present in the composition in an amount effective to reduce the force required to force the extrudable mass through the die by at least about 10 percent, more preferably by at least about 20 percent, and even more preferably by at least about 30 percent, relative to the force required to force the extrudable mass through the die, with all other conditions being substantially the same except for the absence of saccharide ester.

Although applicants do not intend to be bound by or to any particular theory of operation, it is believed that the presence of saccharide ester in the preferred extrudable composition of the present invention provides the benefit of both internal and external lubrication while avoiding the deleterious effects heretofore often associated with internal and external lubricants. An "internal lubricant" is believed to have an effect on the processability of the composition by reducing the cohesive forces which impart viscosity to the composition. By lowering these forces, it is believed that the polymer molecules which make up most of the mass of the composition are able to more easily "slip" past each other with greater ease when pressure is applied. In this manner, the saccharide esters of the present invention preferably produce a decrease in the apparent viscosity of the extrudable composition, which is another measure of extrudability. In certain embodiments, therefore, the saccharide ester is present in the composition in an amount effective to reduce the apparent viscosity of the composition by at least about 10 percent, more preferably by at least about 20 percent, and even more preferably by at least about 30 percent, relative to the apparent viscosity of the composition with all other conditions being substantially the same except for the presence of saccharide ester.

The preferred extrudable compositions of the present invention require comparatively lower force to impart plastic flow to the composition. The methods of the present invention are thus capable of providing an extrusion step utilizing a relatively low head pressure and a relatively low torque required to drive the extrusion process, each of which is also a characteristic by which the extrudablity of the mass can be measured. In certain embodiments, the saccharide ester is preferably present in the composition in an amount effective to reduce the head pressure by at least about 10 percent, more preferably by at least about 20 percent, and even more preferably by at least about 30 percent, relative to the head pressure required with all other conditions being substantially the same except for the presence of saccharide ester. It is also preferred in certain embodiments that the saccharide ester is present in the composition in an amount effective to reduce the extrusion torque by at least about 10 percent, more preferably by at least about 20 percent, and even more preferably at least about 30 percent, relative to the extrusion torque required with all other conditions being substantially the same except for the presence of saccharide ester.

The preferred methods of the present invention are thus capable of producing extrusion product having greatly improved dimensional stability. Preferably the saccharide ester is present in the composition in an amount effective to increase the dimensional stability of the extruded product by at least about 10 percent, more preferably by at least about 20 percent, and even more preferably at least about 30 percent, relative to the dimensional stability of the extruded product with all other conditions being substantially the same except for the presence of saccharide ester. Once again, while applicants do not intend to be bound by or to any particular theory, it is believed that the compositions and processes of the present invention are capable of achieving this desirable result because less energy, whether in the form of heat and/or pressure, is required to impart plastic flow to the extrudable mass of the present invention. Importantly, the preferred embodiments of the present invention achieve this advantageous decrease in extrusion energy, which is an indication of improved extrudability, without any substantial sacrifice or deterioration in dimensional stability, and preferably also without any substantial decrease in tensile strength, in the extruded product. Dimensional stability is assessed by observing the amount by which an extruded shape expands during solidification after it emerges from a die. Such expansion is sometimes referred to as die swell. Relatively low extrusion temperatures can be employed in accordance with the preferred methods of the present invention, and thus the extruded material solidifies sooner after leaving the die. Furthermore, relatively low extrusion pressures can be used in accordance with the preferred methods of the present invention, thereby resulting in a lowering of the residual elastic forces within the emerging extrudate. It is believed that the reduction in the amount of energy which must be dissipated by expansion of the material upon emerging from the die manifests as a desirable reduction in die swell.

Without being bound by or to any particular theory, the saccharide ester of the present invention is also believed to act as an external lubricant at the interface of the composition and a surface contacting the composition, for example at the point of contact between a die and an extrudable composition. This in turn reduces the force required to overcome flow resistance through a conduit or an orifice and also beneficially improves the surface qualities of extrudate, such as an increase in the smoothness of the surface of an extruded article. The quality of the extrudate surface is typically assessed by measuring its reflectivity (gloss). The measurement of gloss is known. See, for example, ASTM standards D-2523-95 and D2457-97. Preferably the saccharide ester is present in the composition in an amount effective to increase the gloss of the extruded product by at least about 10 percent, more preferably by at least about 20 percent, and even more preferably by at least about 30 percent, relative to the dimensional stability of the extruded product with all other conditions being substantially the same except for the presence of saccharide ester.

As it emerges from the orifice opening, the extrudate is preferably cooled to produce a relatively rigid article having the basic shape imparted by the die. The shaped extrudate can be used either in its extruded form, for example, as a decorative molding, as fencing members, as siding for buildings, as pipe, as electrical conduit, as window members, as door jambs, as base board, as flashing, and like products, and all such products produced by the present methods or using the present compositions are within the scope of the present invention. The extrudate also may be cut into convenient length pieces and packaged for use in follow-on processing, for example, as feedstock for an injection or blow molding process.

The present methods in preferred embodiments therefore comprise providing an extrudable composition comprising at least one polyvinyl chloride resin and saccharide ester in an amount effective to improve, relative to the properties of the same composition but in the absence of saccharide ester, at least one measure of extrudability and/or measure of extrudate quality. Preferably, the methods of the present invention produce improvement in at least one measure of extrusion performance and in one measure of extrudate quality. More particularly, the present methods preferably exhibit improved performance in one or more of the following extrudability criteria: extrusion torque; head pressure; and processing stability. The present methods also preferably produce extruded articles which exhibit improvement in one or more of the following properties: surface gloss; dimensional stability; and tensile strength.

The Compositions

The present invention provides extrudable compositions, additive compositions useful in the formulation of extrudable compositions, and extruded compositions formed from the extrudable compositions of the present invention.

The Extrudable Compositions

The preferred compositions of the present invention exhibit improved fusion torque, equilibrium torque, fusion time, equilibrium temperature, and processing stability (dynamic heat stability). As mentioned above, these characteristics will generally result in improvements in the characteristics of the extrusion process. In other words, the inventors have found that inclusion of a saccharide ester, and preferably a sucrose ester, in an extrudable composition, preferably a composition comprising PVC, can provide compositions which display, in comparison to compositions that are substantially the same except for the lack of saccharide ester, greater dynamic heat stability, lower head pressure, lower fusion torque, lower apparent viscosity, and with respect to the extruded products produced therefrom, improved dimensional stability and improved surface gloss.

In addition to the resin and the saccharide ester, the present compositions may optionally include impact modifier, filler, heat stabilizer, processing aids, other lubricants, fillers, binders, colorants, and other processing aids, for example, those described in Handbook of Plastic Materials and Technology, Ed. I. Rubin, Wiley-Interscience, John Wiley & Sons, Inc. New York, 1990 and those described in Plastics Additives and Modifiers Handbook, Ed. J. Edenbaum, Van Nostrand Reinhold, New York 1992, Chapter 3.

Saccharide Esters

It is contemplated that esters of all saccharides, including mono- and di-saccharides, are adaptable for use in connection with the present invention. In preferred embodiments, the saccharide esters comprise or consist essentially of disaccharide esters, more preferably saccharide esters of fatty acids, and even more preferably disaccharide esters of fatty acids. Preferably, the fatty acid esters are synthesized by esterifying a saccharide, and preferably sucrose, with one or more fatty acid moieties obtained from the group consisting of soybean oil, commercial behenic acid, and commercial stearic acid (hereafter, sucrose "soyate," "behenate" and "stearate," respectively), and mixtures thereof. Stearate esters may be synthesized by hydrogenating soyate esters. Preferably, the preferred saccharide esters comprise a saccharide moiety, and preferably a sucrose moiety, which has been substituted by an ester moiety at one or more of its hydroxyl hydrogens. Preferred disaccharide esters have the structure of Formula I.

Formula I:

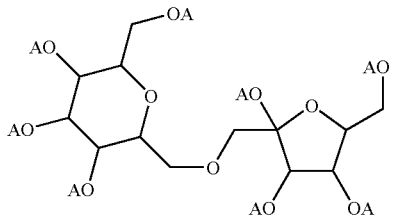

where "A" is hydrogen or of Structure I below:

Structure I

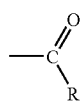

where "R" is a linear, branched, or cyclic, saturated or unsaturated, aliphatic or aromatic moiety of about eight to about 40 carbon atoms, and wherein at least one "A" up to all eight "A" moieties of Formula I are in accordance with Structure I.

Suitable "R" groups include any form of aliphatic moiety, including those which contain one or more substituents, which may occur on any carbon in the moiety. Also included are aliphatic moieties which include functional groups within the moiety, for example, an ether, ester, thio, amino or the like. Also included are oligomer and polymer aliphatic moieties, for example sorbitan, polysorbitan and polyalcohol moieties. Examples of functional groups which may be appended to the aliphatic or aromatic moiety comprising the "R" group include, but are not limited to, halogens, alkoxy, hydroxy, amino, ether and ester functional groups.

In general, the preferred disaccharide esters are sucrose esters in accordance with FIG. I wherein the "R" groups are aliphatic and are linear or branched, saturated or unsaturated and have between about 8 and about 40 carbon atoms.

Most preferred are saccharide esters, preferably sucrose esters, in which the carboxyl groups are derived from fatty acids having between about eight and about 25 carbon atoms, for example, stearic acid ($CH_3(CH_2)_{16}C(O)OH$), behenic acid (docosanoic acid, ($CH_3(CH_2)_{20}C(O)OH$)), and the fatty aids derived from soybean oil, the latter composition being more fully described below.

As used herein the terms "saccharide esters" and "sucrose ester" include compositions possessing different degrees of purity as well as mixtures of compounds of any purity level. For example, the sucrose ester compound can be a substantially pure material, that is, it can comprise a compound having a given number of the "A" groups substituted by only one species of Structure I moiety (that is, all "R" groups are the same and all of the sucrose moieties are substituted to an equal degree). It also includes a composition comprising a blend of two or more sucrose ester compounds, which differ in their degrees of substitution, but wherein all of the substituents have the same "R" group structure. It also includes compositions which are a mixture of compounds having differing degrees of "A" group substitution, and wherein the "R" group substituent moieties are independently selected from two or more "R" groups of Structure I.

For compositions of the present invention, when substantially pure compounds are used, the composition will preferably be comprised of saccharide ester compounds, and even more preferably sucrose ester compounds, having a high degree of substitution. Preferably, more than 70 wt. % of the mass comprising the saccharide ester will comprise moieties will be fully substituted with este.

In general, it is believed that the degree of substitution at the A positions of Formula I with—Structure 1 groups will have an impact on the properties imparted to the compositions. That is, the number of protons (1 to 8) in the "A" position that have been replaced with a moiety of Structure I is believed to be important to one or more of the properties of the composition, such as lubrication properties. In general, the performance improvement imparted to an extrudable PVC composition by a given mass of an added saccharide ester will increase as the weight percentage of fully substituted sucrose ester comprising the mass increases.

For use in the compositions of the present invention, it is preferred to employ disaccharide esters, and preferably sucrose esters, which are fully substituted, that is to say, sucrose esters which have eight ester groups attached to the sucrose moiety, sometimes also referred to herein for convenience as "octa-substituted" sucrose esters. The inventors have observed that the beneficial effects which sucrose esters impart to extrudable PVC compositions are maximized when the entire amount of the sucrose ester included in the composition is octa-substituted. This is to say that for a composition comprising given parts-by-weight of sucrose ester relative to the parts by weight of resin, preferably PVC resin, present in the extrudable composition, the improvement in extrusion properties of the composition generally increases as the degree of ester substitution increases. Further, the inventors have observed also that the beneficial effects imparted to an extrudable PVC composition by the addition of a given weight of a pure aliquot of a less than fully substituted sucrose ester increases non-linearly as the ester aliquot added comprises increasingly more substituted ester, with disproportionately larger gains observed for the more fully substituted species. The beneficial effects on extrudable PVC compositions are maximized when pure aliquots of fully substituted (octa-substituted) sucrose esters are employed.

When mixtures of sucrose ester compounds are used, it is preferred that greater than about 50 wt. % of the ester compounds in the mixture are fully substituted disaccharide esters, that is, all 8 "A" groups of the disaccharide moiety have a structure comprising a moiety of Structure I. In compositions of the present invention it is preferred for the constituents of the disaccharide ester, preferably the sucrose ester, to comprise more than about 70 wt. % fully substituted ester moieties.

Factors to be considered in selecting a sucrose ester for inclusion in an extrudable PVC composition of the present invention include the length and degree of saturation of the "R" groups on the substituent moieties. Additional factors which may be considered include compatibility of the sucrose ester with other lubricants which may be present in the composition and the compatibility of the physical form of the sucrose ester with the processing conditions employed to make the extrudable PVC composition. For example, it may be more convenient to process a sucrose ester which is a solid rather than a liquid under ambient conditions.

Saccharide esters can be made by esterification with substantially pure fatty acids (for example, stearic acid to produce sucrose stearate) by known processes of esterification. They can be prepared also by trans-esterification using saccharide and fatty acid esters in the form of fatty acid glycerides derived, for example, from natural sources, for example, those found in oil extracted from oil seeds, for example soybean oil. Trans-esterification reactions providing sucrose esters using fatty acid glycerides are described, for example, in U.S. Pat. Nos. 6,504,003 to Trout et al. and 6,121,440 to Kenneally et al. In the Trout patent, Example I describes a trans-esterification reaction providing a sucrose ester in which 78 wt. % of the product esters are octyl-substituted esters (fully substituted), the balance of the product comprising a distribution of mono-, di-, tri-, tetra-, penta-, hexa-, and hepta-substituted sucrose esters.

As mentioned above, sucrose esters can be prepared by trans-esterification of sucrose from methyl ester feedstocks which have been prepared from glycerides derived from natural sources. As a consequence of the source of the fatty acids, the feedstock used to prepare the sucrose ester contains a range of saturated and unsaturated fatty acid methyl esters having fatty acid moieties containing between 12 and 26 carbon atoms. This will be reflected in the product sucrose esters made from such a source in that the sucrose moieties comprising the product will contain a mixture of ester moiety substituents, wherein, with reference to Structure I above, the "R" groups will be a mixture having between 12 and 26 carbon atoms with a ratio that reflects the feedstock used to prepare the sucrose ester. Further to illustrate this point, sucrose esters derived from soy bean oil will be a mixture of species, having "R" group structures which reflect that soybean oil comprises 26 wt. % triglycerides of oleic acid (H3C—[CH2]7-CH═CH—[CH2]7C(O)OH), 49 wt. % triglycerides of linolenic acid (H3C—[CH2]3-[-CH2-CH═CH]2-[-CH2-]7-C(O)OH), 11 wt. % of triglycerides of linolenic acid (H3C—[-CH2-CH═CH-]3-[-CH2-]7-C(O)OH), and, 14 wt. % of triglycerides of various saturated fatty acids, as described in the Seventh Ed. Of the Merck Index, which is incorporated herein by reference. All of these fatty acid moieties are represented in the "R" groups of the substituents in the product sucrose ester. Accordingly, when referring to a sucrose ester herein as the product of a reaction employing a fatty acid feed stock derived from a natural source, for example, sucrose soyate, sucrose behenate, and sucrose stearate, the term is intended to include all of the various constituents which are typically found as a consequence of the source from which the sucrose fatty acid ester is prepared.

For use in the processes and compositions of the present development, preferred sucrose esters are those synthesized by trans-esterification of sucrose with fatty acid glycerides obtained from soybean oil, or by trans-esterification with esters or glycerides derived from either behenic acid or stearic acid from natural sources, and mixtures thereof. Such sucrose esters are referred to herein as sucrose "soyate," sucrose "behenate," and sucrose "stearate," respectively.

For use in compositions of the present invention, sucrose esters esterified with stearate or hydrogenated soyate moieties are especially preferred, for example, sucrose stearate. It will be appreciated that commercially available stearic acid is a mixture of saturated and unsaturated linear fatty acid species having between 12 and 18 carbon atoms in the aliphatic portion of the acid, referred to herein as a "stearyl" group.

It will be appreciated also that other saccharides and polyfunctional alcohols can be esterified to provide ester lubricants which provide the volumetric density of fatty acid moieties afforded by the sucrose esters described above. Examples of these esters are the polyesters described in U.S. Pat. Nos. 6,504,003 to Trout et al. and 6,121,440 to Kenneally et al, which are incorporated herein by reference. It is contemplated that the substitution of some or all of the sucrose esters in the compositions described above with the above-mentioned polyester lubricants will afford a composition having similarly improved dynamic processing improvements over extrudable PVC compositions which do not include any of the polyesters or the saccharide esters described above.

The amount of saccharide ester in the compositions of the present invention can vary widely depending upon numerous factors, including the desired level of improvement in processing parameters and/or the particular characteristics desired of the extrudable PVC composition. In preferred embodiments, the present compositions comprises from about 0.01 to about 2 parts by weight of saccharide ester, preferably sucrose ester, per 100 weight parts of resin in the composition (hereinafter, "per 100 wt. parts of resin" is abbreviated PHR). In other embodiments it is preferable that the composition contain from about 0.05 PHR to about 0.9 PHR of saccharide ester, preferably sucrose ester, more preferably from about 0.1 PHR to about 0.8 PHR and even more preferably from about 0.1 PHR to about 0.4 PHR.

The Resin

The compositions of the present invention may include thermoplastic resin or resins which exhibit thermoplastic properties or which are otherwise extrudable. Thus, it is contemplated that resins such as polycarbonates, ABS plastics and high engineering plastics may be used. It is generally preferred, however, that the resin of the present compositions comprise, and preferably consist essentially of, vinyl based resin, that is, one or more polymers (including homopolymers, copolymers, terpolymers, etc.) that share the vinyl radical (CH2═CH) as a starting structural unit. Particularly preferred is polyvinyl chloride (PVC), and in particular suspension, dispersion, emulsion or bulk PVC resins, with suspension and bulk PVC resins being preferred. In preferred embodiments, the PVC resin of the present invention has a Filentscher K-value of from about 50 to about 70, and even more preferably from about 55 to about 65.

Additives

As mentioned above, extrudable compositions of the present invention may include also other additives typically included in extrudable compositions, preferably PVC resin, as described above, including those additives which have heat-stabilizing properties and including also those which have internal and external lubricant properties. Herein, these are termed "supplemental" to distinguishing them from the saccharide esters of the invention which also have lubricating and heat stabilizing properties. Accordingly, the amount of saccharide ester employed can be adjusted according to the amount of supplemental lubricants, stabilizers, etc. in the composition in accordance with known principles.

The extrudable compositions of the present invention may be prepared by any known means of blending solid or semi-solid materials with other solid, semi-solid, or liquid materials. Any type of mixing or blending equipment on a scale from manual laboratory bench-top scale, for example a hand-held motorized mixer and vessel, to motorized industrial scale processing equipment can be used. Examples of the latter type of equipment include a Henschel mixer and a ribbon blender.

Conveniently, an extrudable composition can be prepared by placing a weighed amount of resin, preferably a polyvinyl chloride resin (PVC resin) into a blending apparatus, adding in turn the desired supplemental additive constituents, for example, stabilizers, fillers, processing aids, colorants, and pigments, and other ingredients desired in the composition, and adding to the mass, as described above, an amount of one or more sucrose esters equivalent to between about 0.01 and about 2 weight parts additional per 100 weight parts of the PVC-resin added to the composition. Thus, for 100 weight parts of PVC-resin (PHR) contained in the composition, the composition will also contain a mass of between about 0.01 and about 2 weight parts comprising one or more sucrose esters.

Additive Compositions

The present invention provides also additive compositions. In one embodiment, additive compositions of the invention are formulated to be added to a composition comprising extrudable resin, preferably PVC resin, optionally with other additives, to provide an extrudable composition of improved processing and/or extrudate properties, as defined herein.

In general, an additive composition can comprise any of the additives described above for use in extrudable compositions. Supplemental internal and external lubricants, heat stabilizers, and other constituents of extrudable PVC compositions and the variables governing the selection and amounts of these supplemental additives used in extrudable PVC compositions are described generally in the Plastics Additives and Modifiers Handbook, Ed. J. Edenbaum, Van Nostrand Reinhold, New York 1992, which portions are incorporated herein by reference. Preferred additive compositions comprise at least one saccharide ester and at least one member of the group consisting of compatible supplemental lubricants and compatible supplemental heat stabilizers.

For example, in one embodiment, an additive composition of the present invention may be formulated to comprise all of the constituents, except for a PVC resin, which comprise an extrudable PVC composition. An additive composition of this type is formulated to be mixed with only a PVC resin and thereby provide an extrudable PVC composition. In an alternative embodiment, an additive composition may be formulated to be added to an extrudable PVC composition as one of many additive constituents used to prepare the extrudable composition. In the latter embodiment, it is preferred for an additive composition to comprise at least some of the most common constituents of extrudable PVC compositions, thereby providing a single additive composition which can be used in a number of different extrudable PVC compositions while reducing the number of addition processes required to prepare an extrudable PVC composition.

It is contemplated that a wide variety of components over a wide range of relative ratios will be adaptable for use in the present invention in view of the teachings contained herein. Furthermore, it is believed that the teachings contained herein will allow a person skilled in the art to readily determine if a particular extrudable composition additive is compatible with a particular saccharide ester.

The additive compositions of the present invention may be prepared by any known means for admixing solid, semi-solid, or liquid materials with other solid, semi-solid, or liquid materials, including techniques used for the admixture of miscible materials, for example a mixture of two or more components forming a single phase, and techniques used for blending phase separated materials to form an intimate interpenetrating structure of domain-separated regions of two or more immiscible or partially immiscible materials. Any type of mixing or blending equipment on a scale from manual laboratory bench top scale, for example a hand-held motorized mixer and vessel, to motorized industrial scale processing equipment can be used. Examples of the latter type of equipment include a Henschel mixer and a temperature controlled agitated blend tank. It will be appreciated that the additive composition of the present invention may be prepared as a separate composition for admixture with an extrudable PVC composition of the type described above. Alternatively, each and severally, the constituents of the additive composition may be added either simultaneously or sequentially to an extrudable PVC composition without first blending them together. Additionally, when added as a series of components to an extrudable PVC composition, it will be appreciated that the order of addition is generally not critical.

Examples of supplemental internal lubricants which are preferred for use in the preparation of lubricant-based additive compositions include metallic soaps, for example calcium stearate, and fatty acid ester waxes known to be internal lubricants, for example distearyl phthalate. Examples of supplemental external lubricants preferred for use in the preparation of lubricant-based additive compositions are hydrocarbon waxes, for example, paraffin waxes, amide waxes, for example, ethylene bis(stearamide) wax, polyethylene waxes, for example, A-C® 6A (Honeywell), and oxidized polyethylene waxes, for example, A-C® 629 A (Honeywell). In preferred embodiments, the additive compositions comprise saccharide ester, preferably sucrose ester, and a supplemental lubricant selected from the group consisting of paraffin wax lubricants, oxidized polyethylene lubricants, and combinations of these. For additive compositions which contain a paraffin lubricant, it is preferred in certain embodiments that calcium hydroxide and a fatty acid are included also in the composition. Alternatively, the composition may include instead the direct addition of a fatty acid salt.

Generally, additive compositions consisting essentially of a sucrose ester and wax lubricant, for example, Rheolub® 165 Paraffin Wax (Honeywell). The compositions preferably comprise about 1 wt. % to about 50 wt. % saccharide ester, more preferably from about 5 wt. % to about 30 wt. % of saccharide ester, and even more preferably from about 5 wt. to about 25 wt. % of to saccharide ester, with sucrose esters being generally preferred for use. The compositions preferably comprise from about 1 wt. to about 99 wt. % wax lubricant, more preferably from about 20 wt. % to about 85 wt. % wax lubricant, and even more preferably from about 30 wt. % to about 80 wt. % of wax lubricant, with paraffin wax lubricants being generally preferred for use.

Generally, additive compositions consisting essentially of a saccharide ester (preferably sucrose ester), and oxidized polyethylene lubricant, for example A-C 629® (Honeywell), preferably comprise from about 1 wt. % to about 99 wt. % saccharide ester, more preferably from about 9 wt. % to about 56 wt. % of saccharide ester, and from about 1 wt. % to about 75 wt. % oxidized polyethylene lubricant, and even more preferably from about 7 wt. % to about 45 wt. % polyethylene lubricant.

In general, when an additive composition comprises a blend of one or more paraffin wax lubricants with one or more oxidized polyethylene lubricants, the composition preferably comprises: (a) from about 5 wt. % to about 85 wt. % sucrose ester, more preferably from about 5 wt. % to about 30 wt %, and more preferably from about 7 wt % to about 20 wt % sucrose esters; (b) from about 10 wt. % to about 90 wt. % paraffin wax lubricant, more preferably from about 30 wt. % to about 70 wt. % paraffin wax lubricant; and (c) from about 5 wt. % to about 20 wt. % oxidized polyethylene lubricant, more preferably from about 7 wt. % to about 15 wt. % oxidized polyethylene lubricant.

When a paraffin wax lubricant is present, with or without additional lubricants, the additive composition optionally but preferably includes calcium hydroxide and fatty acid, for example, stearic acid. In general, the weight ratio of calcium hydroxide:fatty acid is preferably from about 1:4 to about 1:10, more preferably about 1:7 to 1:10, and even more preferably about 1:9. Preferably the combined amount of calcium hydroxide and fatty acid in the composition is up to about 1.1 times the amount on a weight basis of the remaining constituents of the additive composition, and even more preferably in an amount of from about 0.02 times to about 1 times the combined weight of the other constituents of the composition.

In general, when the composition contains fatty acid and calcium hydroxide constituents, the composition is preferably prepared by blending together a wax in liquid form and a fatty acid, followed by a reaction step carried out under conditions in which at least a portion of the fatty acid is neutralized, as dictated by art-recognized variables with regard to the properties desired in the extrudable PVC composition into which the finished additive composition is to be blended. Preferably, the mixing and temperature conditions attained during the blending of the constituents of additive compositions which include a fatty acid and calcium hydroxide are adjusted to insure that the neutralization reaction between the hydroxide and the acid proceeds substantially to completion. Following this, any additional internal or external lubricants to be included in the composition are preferably sequentially melt-blended into the mass and any other additives or processing aids to be included are added. The mass is then preferably filtered and processed by known means to render it into a form suitable for use as an additive, for example, prilling, flaking, pastelation, and slabbing.

As described above, alternatively to the addition of calcium hydroxide and a fatty acid to an additive composition, a fatty acid salt, for example, calcium stearate, may be added to the composition, typically in an amount up to about 1.1 times on a weight basis of the combined weight of the other constituents in the composition. Greater amounts of a fatty acid salt can be added depending upon known variables. In general, if the additive composition includes a fatty acid salt, the constituents are preferably dry-blended in accordance with the principles described herein.

As mentioned above, an additive composition can be prepared which consists essentially of at least one sucrose ester and at least one constituent comprising a supplemental heat-stabilizing additive. For use in formulating such an additive composition it is preferred to use supplemental heat stabilizers having physical properties similar to a paraffin wax lubricant, permitting them to act like a "carrier" into which the sucrose ester can be blended. It will be appreciated that the same processes described above for the preparation of lubricant-based additive compositions can be employed in the preparation of heat stabilizer-based additive compositions.

As used herein, the term "supplemental heat stabilizers" includes any of the supplemental additives known to exert a dynamic heat-stabilizing effect when added to an extrudable PVC composition. Examples of supplemental heat stabilizers suitable for use in the preparation of additive compositions include those generally used as heat stabilizing additives in extrudable PVC compositions, for example, compounds containing tin, for example, tin mercaptides. Other art-recognized heat stabilizers, for example, those described generally in the Plastics Additives and Modifiers Handbook, Ed. J. Edenbaum, Van Nostrand Reinhold, New York 1992 (which is incorporated herein by reference), for example, those based on lead-based compounds, for example, neutral lead stearate and dibasic lead phosphate, may be used also. Additionally, "mixed-metal" soaps may be used, for example calcium/zinc stearates. Additionally, heat stabilizers which are not based on heavy metal salts may be used, for example, organic-based stabilizers (OBS) from Crompton Corporation. It will be appreciated that, as for the additive compositions based on art-recognized lubricants described above, additive compositions based on art-recognized heat stabilizers may include additionally, any of the other additive constituents typically incorporated into extrudable PVC compositions.

The following examples are presented for the purpose of illustrating the forgoing description and are not meant to limit the scope of the claimed invention.

EXAMPLES

Example I and Comparative Examples A and B

A PVC resin-containing extrudable composition of the present invention (Example I) and two similar compositions, prepared with the same constituents, but substituting the sucrose ester lubricant for a known external lubricant (comparative Example A) and a known internal lubricant (comparative Example B) are presented below.

The compositions were prepared by charging the constituent components into a Waring Blender (high intensity mixer) and heating to a temperature in excess of 105° C. while operating the mixing blades. When the components were homogeneously blended, the composition was discharged, cooled to ambient temperature and left to stand for 24 hours (aging period).

At the end of the aging period a 68 g sample of the composition was placed into a Brabender torque rheometer and subjected to rheometric analysis. As described above, each composition was subjected to rheometric analysis of the fusion and stability time, equilibrium and fusion torque and equilibrium temperature according to ASTM standard testing procedure D2538-02. Using this procedure, comparison of the stated rheometric properties was made between a composition of the present invention (Example I) and the two comparative example compositions, comparative Example A (containing an external lubricant in lieu of the sucrose ester lubricant) and comparative Example B (containing an internal lubricant in lieu of the sucrose ester lubricant). The results of these determinations are presented in Table I and discussed below.

The materials used to prepare the various example and comparative example compositions were as follows: 1091® polyvinyl chloride resin (resin) from Georgia Gulf; TM281® tin based heat stabilizer (stabilizer) from Rohm & Haas; Rheolub® 165 paraffin wax (paraffin wax) from Honeywell; COAD 10® calcium stearate (calcium lubricant) from Norac; A-C® 629 oxidized polyethylene wax from Honeywell (polymer wax); K120N® acrylic processing aid (processing aid) from Rohm & Haas; KM334® acrylic impact modifier (impact modifier) from Rohm & Haas; UFT® calcium carbonate from OMYA (calcium carbonate); titanium dioxide (TiO2); stearyl stearate (ester lubricant "a"), and distearyl phthalate (ester lubricant "b") which are articles of commerce; and sucrose stearate (ester lubricant "c") which was obtained from Procter & Gamble. All materials were used as received.

Two comparative examples and one example composition were prepared as described above using the materials described, in the amounts described in Table I, below.

Table I

TABLE I

| Constituent | Wt. Parts relative to 100 weight parts resin | | |
|---|---|---|---|
| | Comparative Example | | |
| | A | B | Example I |
| Resin | 100 | 100 | 100 |
| Stabilizer | 0.8 | 0.8 | 0.8 |
| Paraffin wax | 1 | 1 | 1 |

TABLE I-continued

| | Wt. Parts relative to 100 weight parts resin | | |
| | Comparative Example | | |
| Constituent | A | B | Example I |
| --- | --- | --- | --- |
| Polymer wax | 0.15 | 0.15 | 0.15 |
| Calcium lubricant | 1.1 | 1.1 | 1.1 |
| Processing aid | 1 | 1 | 1 |
| Impact modifier | 4 | 4 | 4 |
| Calcium carbonate | 5 | 5 | 5 |
| $TiO_2$ | 8 | 8 | 8 |
| Ester lubricant | 0.5[a] | 0.5[b] | 0.5[c] |

[a] lubricant is stearyl stearate
[b] lubricant is distearyl phthalate
[c] lubricant is sucrose stearate The compositions thus prepared were subjected to rheological analysis as described above. In carrying out the analysis, the rheometer bowl temperature was set at 180° C. and the rotor speed was set to 80 rpm. The results of this analysis are presented in Table II, below.

TABLE II

| Parameter | Comparative Example A | Comparative Example B | Example I |
| --- | --- | --- | --- |
| Equilibrium Temp (° C.) | 213 | 214 | 198 |
| Fusion Torque (g · m) | 3,150 | 3,500 | 2,750 |
| Equilibrium Torque (g · m) | 2,000 | 2,000 | 1,750 |
| Fusion Time (sec) | 60 | 45 | 60 |
| Stability time* | 9 | 8 | 12 |

*elapsed time between fusion and measurable onset of cross-linking (minutes)

These data show that a PVC resin-containing composition which includes a sucrose ester lubricant possesses extrusion properties which are superior to compositions containing only art-recognized lubricants (comparative Examples A & B). The reduction by the sucrose ester in equilibrium temperature and torque compared with the internal lubricant suggests that the sucrose ester lubricant performs, in part, in the manner of an internal lubricant. It also indicates that the sucrose ester provides superior apparent viscosity reduction to that afforded by the known distearyl phthalate internal lubricant.

These data also show that the composition of the present invention displays a reduction in fusion torque without a concomitant increase in fusion time when compared to the stearyl stearate external lubricant. This suggests that the sucrose ester performs, in part, as external lubricant with properties superior to stearyl stearate.

Table II also indicates that the processing properties of the present invention composition (which contains sucrose ester) are improved over, and the dynamic heat stability exceeds that of, the prior art compositions which contain only supplemental lubricants adjusted to provide similar levels of lubricating properties. It is expected from these data that the compositions of the present invention will require less extruder torque and/or less extruder head pressure for the same rate of extrusion of the PVC composition when compared to the compositions of the comparative examples. It is also expected that the compositions of the present invention will provide an extruded article having superior surface gloss by virtue of the superior external lubricant performance afforded by the sucrose ester compositions over compositions containing only the art-recognized external lubricants. As mentioned above, the data in Table II indicates also that the present compositions exhibit increased dynamic heat stability, as indicated by the increase in heat stability time.

Examples II-VI

Additive Compositions

There follows seven example additive compositions comprising: (i) a sucrose ester and paraffin wax lubricant (Example II); (ii) a sucrose ester and an oxidized polyethylene lubricant (Example III); (iii) sucrose ester, paraffin wax lubricant, and an oxidized polyethylene lubricant (Example IV); (iv) sucrose ester, paraffin wax lubricant, calcium hydroxide and stearic acid (Example V); (v) sucrose ester, oxidized polyethylene lubricant, paraffin wax lubricant, calcium hydroxide and stearic acid (Example VI); (vi) a sucrose ester, a paraffin wax lubricant, and calcium stearate (Example VII); and (vii) a sucrose ester, an oxidized polyethylene lubricant, a paraffin wax lubricant, and calcium stearate (Example VIII). In all of the example preparations, the sucrose stearate referred to is an article of commerce obtained from Procter and Gamble, the paraffin wax referred to is RL-165-010® (Honeywell), the oxidized polyethylene wax referred to is AC®-629 (Honeywell), the calcium hydroxide referred to is an article of commerce, and the stearic acid referred to is commercial grade material from Proctor & Gamble.

In the following examples, melt blending refers to placing the paraffin and polyethylene constituents of the composition into a blend tank and heating to about 132° C. The constituents are blended for about one hour, with the time being adjusted as needed to provide a homogeneous admixture of the materials. When the paraffin and polyethylene constituents are homogeneous, the sucrose stearate is first added, followed by the addition to the mass, each in turn, of any remaining of the constituents. When the composition involves the preparation of an acid salt, by blending a base and a fatty acid into the composition, blending is continued until the desired acid number is reached. As each constituent is added to the vessel, blending is carried out for about 15 minutes between additions and for an additional one hour period following the addition of the last constituent. The blended material is then filtered through a bag filter and prilled.

As noted in some examples, a dry blending procedure will be used. The dry blending procedure comprises placing the sucrose ester and the other constituents of the composition into a ribbon blender under ambient conditions and blending the constituents for a period which is sufficient to provide intimate admixture of the constituents. Typically this is achieved after about 30 minutes blending time.

As mentioned in each example, the improved extrusion properties expected by adding the indicated amount of the composition to an extrudable PVC composition include a reduction in the head pressure and/or extrusion torque necessary to extrude the PVC composition with which the additive composition is blended, and/or an increase in the dynamic heat stability of the PVC composition, and/or an increase in the surface gloss of an extruded article comprising the blend.

Example II

An additive composition will be prepared by melt-blending, at a temperature of about 132° C., 9 g of sucrose stearate and 33.1 g of paraffin wax in accordance with the above-described procedure. It is expected that when an amount of this composition sufficient to provide about 0.1 wt. parts of sucrose ester PHR is blended with an aliquot of a PVC resin-containing extrudable PVC composition, there will be observed an improvement in the extrusion processing properties of the extrudable PVC composition.

Example III

An additive composition will be prepared by melt-blending, at a temperature of about 132° C., 9 g of sucrose stearate and 7.2 g oxidized polyethylene wax in accordance with the above-described procedure. It is expected that when an amount of this composition sufficient to provide about 0.1 wt. parts of sucrose ester PHR is blended with an aliquot of a PVC resin-containing extrudable PVC composition, there will be observed an improvement in the extrusion processing properties of the extrudable PVC composition.

Example IV

An additive composition will be prepared by melt-blending, at a temperature of about 132° C., 9 g of sucrose stearate, 33.1 g of paraffin wax, and 7.2 g oxidized polyethylene wax in accordance with the above-described procedure. It is expected that when an amount of this composition sufficient to provide about 0.1 wt. parts of sucrose ester PHR is blended with an aliquot of a PVC resin-containing extrudable PVC composition, there will be observed an improvement in the extrusion processing properties of the extrudable PVC composition.

Example V

An additive composition will be prepared by melt-blending, at a temperature of about 132° C., 9 g of sucrose stearate and 33.1 g paraffin wax (Honeywell) according to the above-described procedure. After about 15 minutes of blending the wax and sucrose stearate, about 5.1 g of calcium hydroxide and 45.6 g of stearic acid is added to the mixture. The mixture is heated to about 155° C. and held at a temperature of at least 150° C. with continued blending until the mixture titrates to give an acid number of between 22 and 24 g KOH/g of mixture.

When an amount of this composition sufficient to provide about 0.1 wt. parts of sucrose ester PHR of the PVC resin is blended with in an aliquot of an extrudable PVC composition, it is expected that an improvement in extrusion processing properties of the extrudable PVC composition will be observed.

Example VI

An additive composition will be prepared by adding to 49.3 g of an additive composition prepared according to Example IV, 5.1 g of calcium hydroxide and 45.6 g of stearic acid according to the procedure described for Example V.

When an amount of this composition sufficient to provide about 0.1 wt. parts of sucrose ester PHR of the PVC resin is blended with an aliquot of an extrudable PVC composition, it is expected that in improvement in extrusion processing properties of the extrudable PVC composition will be observed.

Example VII

An additive composition will be prepared by dry-blending 9 g of sucrose stearate and 33.1 g of paraffin wax under ambient conditions in a ribbon blender under ambient conditions in accordance with the above-described dry-blending procedure. After the initial blending period, 50 g of calcium stearate are added to the mixture followed by an additional blending period of about 1 hour.

It is expected that when an amount of this composition sufficient to provide about 0.1 wt. parts of sucrose ester PHR is blended with an aliquot of a PVC resin-containing extrudable PVC composition, there will be observed an improvement in the extrusion processing properties of the extrudable PVC composition.

Example VIII

An additive composition will be prepared by dry-blending 9 g of sucrose stearate, 33.1 g of paraffin wax, and 7.2 g of oxidized polyethylene wax under ambient conditions in a ribbon blender according to the procedure described above. After the initial blending period, 50 g of calcium stearate are added to the mixture followed by an additional blending period of about 1 hour.

It is expected that when an amount of this composition sufficient to provide about 0.1 wt. parts of sucrose ester PHR is blended with an aliquot of a PVC resin-containing extrudable PVC composition, there will be observed an improvement in the extrusion processing properties of the extrudable PVC composition.

Next is described an additive composition comprising an art-recognized heat stabilizer and sucrose stearate.

Example IX

An additive composition will be prepared by dry-blending 9 g of sucrose stearate and 5 g of Mark A 70® (an OBS heat stabilizer, Crompton Corporation, used as received) under ambient conditions in accordance with the above-described dry-blending procedure. Blending will be carried out until a homogeneous admixture is provided.

It is expected that when an amount of this composition sufficient to provide about 0.1 wt. parts of sucrose ester PHR is blended with an aliquot of a PVC resin-containing extrudable PVC composition, there will be observed an improvement in the extrusion processing properties of the extrudable PVC composition.

What is claimed is:

1. A process for extruding a resin-containing composition comprising:
    a) providing an extrudable mass comprising at least one extrudable resin and at least one saccharide ester of Formula I:

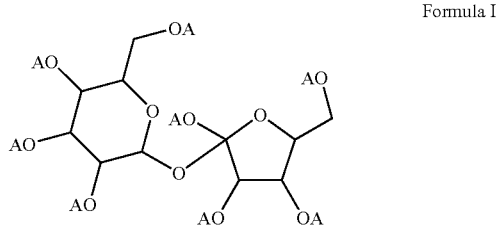

Formula I wherein each "A" is independently hydrogen or has the structure of Structure I:

Structure I wherein each "R" is independently an aliphatic or aromatic moiety of about eight to about 40 carbon atoms, and wherein all of the "A" moieties of at least about 50 wt. % of the compounds of Formula I comprise moieties of Structure I; and b) extruding said extrudable mass to produce an extrudate.

2. The process of claim 1 wherein said saccharide ester is present in an amount effective to improve the extrudability of said extrudable mass relative to the extrudability of the extrudable mass in the absence of said saccharide ester.

3. The process of claim 1 wherein said saccharide ester is present in an amount effective to improve the extrudability of said extrudable mass by at least about 10 percent relative to the extrudability of said extrudable mass in the absence of said saccharide ester.

4. The process of claim 1 wherein said step of extruding produces an extruder head pressure and wherein saccharide ester is present in an amount effective to reduce said extruder head pressure relative to use of the same composition without said saccharide ester.

5. The process of claim 1 wherein said step of extruding produces an extruder head pressure and wherein saccharide ester is present in an amount effective to reduce said extruder head pressure by at least about 10 percent relative to use of the same composition without said saccharide ester.

6. The process of claim 1 wherein said step of extruding produces an extruder torque and wherein saccharide ester is present in an amount effective to reduce the required extruder torque relative to use of the same composition without said saccharide ester.

7. The process of claim 1 wherein said step of extruding produces an extruder torque and wherein saccharide ester is present in an amount effective to reduce the required extruder torque by at least about 10 percent relative to use of the same composition without said saccharide ester.

8. The process of claim 1 wherein said saccharide ester is present in an amount effective to increase extrudate gloss relative to the use of said composition without said saccharide ester.

9. The process of claim 1 wherein said saccharide ester is present in an amount effective to increase extrudate gloss by at least about 10 percent relative to the use of said composition without said saccharide ester.

10. The process of claim 4 wherein said saccharide ester is present in an amount effective to reduce said extruder head pressure by at least about 10 percent relative to use of the same composition without said saccharide ester and wherein the extrudate gloss is not substantially reduced relative to the use of said composition without said saccharide ester.

11. The process of claim 6 wherein said saccharide ester is present in an amount effective to reduce said extruder torque by at least about 10 percent relative to use of the same composition without said saccharide ester and wherein the extrudate gloss is not substantially reduced relative to the use of said composition without said saccharide ester.

12. The process of claim 4 wherein said saccharide ester is present in an amount effective to reduce said extruder head pressure by at least about 10 percent relative to use of the same composition without said saccharide ester and wherein the dimensional stability of said extrudate is not substantially reduced relative to the use of said composition without said saccharide ester.

13. The process of claim 6 wherein said saccharide ester is present in an amount effective to reduce said extruder torque by at least about 10 percent relative to use of the same composition without said saccharide ester and wherein the dimensional stability of said extrudate is not substantially reduced relative to the use of said composition without said saccharide ester.

14. The process of claim 1 wherein said saccharide ester is present in an amount effective to increase dynamic heat stability of the extrudable mass relative to said mass in the absence of said saccharide ester.

15. The process of claim 1 wherein said saccharide ester comprises one or more compounds in which each "R" is an aliphatic moiety of about eight to about 40 carbon atoms.

16. The process of claim 1 wherein all of the "A" moieties of at least about 70 wt. % of the saccharide ester compounds of Formula I comprise moieties of Structure I.

17. The process of claim 16, wherein substantially each "R" moiety of Structure I is a stearyl moiety.

18. The process of claim 1 wherein the amount of saccharide ester present in said extrudable composition is from about 0.01 PHR to about 2 PHR.

19. The process of claim 1 wherein said extrudable resin comprises polyvinyl chloride resin.

20. The process of claim 1 wherein all of the "A" moieties of substantially all of said saccharide ester compounds of Formula I comprise moieties of Structure I.

21. The process of claim 1 wherein the amount of saccharide ester present in said extrudable composition is from about 0.05 PHR to about 0.9 PHR.

22. The process of claim 1 wherein the amount of saccharide ester present in said extrudable composition is from about 0.1 PHR to about 0.8 PHR.

23. The process of claim 1 wherein the amount of saccharide ester present in said extrudable composition is from about 0.1 PHR to about 0.4 PHR.

24. The process of claim 1 wherein said saccharide ester compound comprises one or more compounds of Formula I:

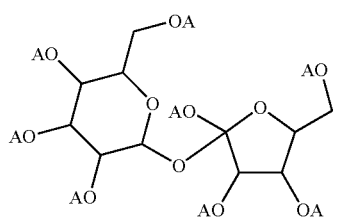

Formula I wherein each "A" is independently hydrogen or has the structure of Structure I:

Structure I wherein substantially each "R" is an aliphatic moiety of about 12 to about 26 carbon atoms.

25. A process for extruding a composition comprising:

providing an extrudable composition comprising an extrudable resin, at least one saccharide ester, and at least one additional constituent selected from the group consisting of supplemental lubricants, supplemental heat stabilizers and combinations of these, said at least one saccharide ester being at least one compound of Formula I:

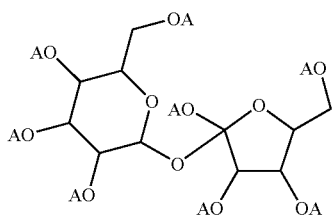

Formula I wherein each "A" is independently hydrogen or has the structure of Structure I:

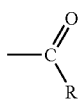

Structure I wherein each "R" is independently an aliphatic or aromatic moiety of about eight to about 40 carbon atoms, and wherein all of the "A" moieties of at least about 50 wt. % of the compounds of Formula I comprise moieties of Structure I; and extruding the extrudable composition to produce an extrudate.

26. The process of claim 24 wherein said composition comprises saccharide ester in an amount of from about 0.01 PHR to about 2 PHR.

27. The process of claim 24 wherein said composition comprises saccharide ester in an amount of from about 0.1 PHR to about 0.4 PHR.

28. The process of claim 24 wherein said saccharide ester comprises sucrose soyate.

29. The process of claim 24 wherein said saccharide ester comprises sucrose behenate.

30. The process of claim 24 wherein the saccharide ester is selected from the group consisting of sucrose stearate, sucrose soyate, sucrose behenate and combinations of these.

31. The process of claim 20 wherein said composition further comprising calcium stearate.

32. The process of claim 25 wherein said composition further comprises a mixture of calcium hydroxide and stearic acid present in a ratio of from about 1:6 to about 1:10.

33. The process of claim 25 wherein said additional constituent comprises at least one lubricant selected from the group consisting of paraffin wax lubricants and oxidized polyethylene lubricants and said saccharide ester is present in an amount of from about 1 wt. % to about 99 wt. % of the additive composition.

34. The process of claim 25 wherein said additional constituent comprises at least one member selected from the group consisting of tin-based heat stabilizers, organic-based heat stabilizers, heavy metal-based heat stabilizers and mixed metal-based heat stabilizers, and wherein said saccharide ester is present in an amount of from about 1 wt. % to about 99 wt. % of the total of said additives.

* * * * *